Patented May 24, 1938

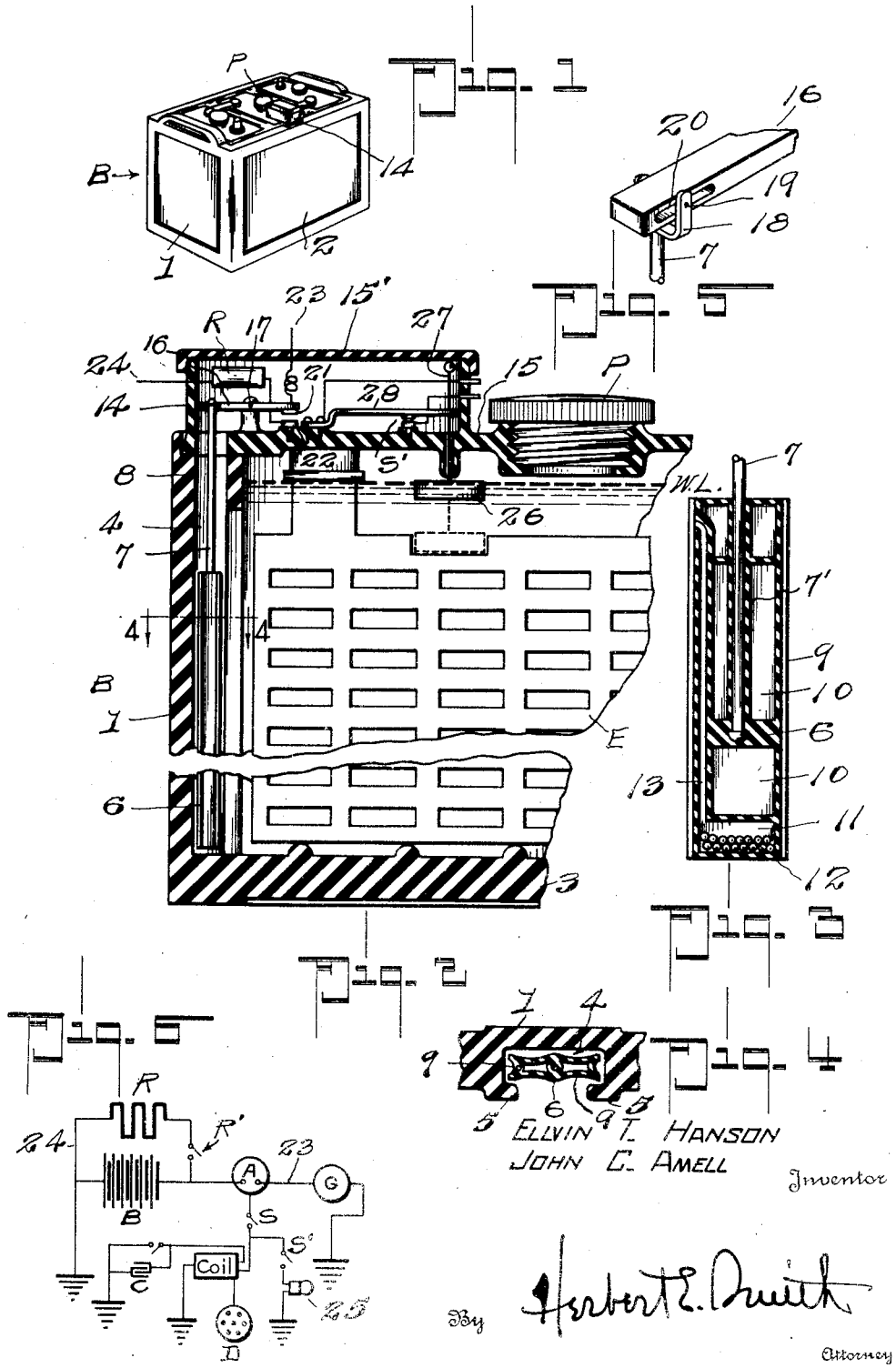

2,118,558

UNITED STATES PATENT OFFICE 2,118,558

CONTROL DEVICE FOR STORAGE BATTERIES

Ellvin T. Hanson and John C. Amell, Spokane, Wash.

Application August 16, 1935, Serial No. 36,585

1 Claim. (Cl. 136—182)

Our present invention relates to an improved control device for storage batteries which devices are electrically operated for controlling the charging operation of the battery to prevent excess charging of the battery. In carrying out our invention we avail ourselves of the use of variations in the specific gravity of the electrolyte to automatically operate the safety control device. Our invention is especially designed for use in connection with the ignition circuit and battery of motor vehicles, to prevent the overcharging of the battery when the engine of the vehicle is running.

We utilize a control-float in the electrolyte of the battery which has a predetermined weight and is not sufficiently buoyant to operate the electric control device when the specific gravity of the electrolyte is not above normal, say approximately 1275. When the storage battery is being charged, in the ignition system of the vehicle, by the operation of the engine, and when the specific gravity of the electrolyte attains an excessive degree due to this charging operation by the engine, the control device becomes effective. When the specific gravity of the electrolyte rises above a certain predetermined degree, and above the weight of the control float, the latter becomes buoyant and through its floating movement causes a circuit maker to be closed, thereby shunting the charging current in the ignition circuit around the battery. When the specific gravity of the electrolyte again falls to the normal point, below that of the control-float, the latter sinks, and automatically opens the closed shunt-switch.

Our invention consists in certain novel combinations and arrangements of parts as will hereinafter be more fully set forth and claimed. In the accompanying drawing we have illustrated one complete example of the physical embodiment of our invention wherein the parts are combined and arranged according to one mode we have thus far devised for the practical application of the principles of our invention.

Figure 1 is a perspective view of a standard storage battery adapted for use on motor vehicles, and equipped with the automatic control device of our invention.

Figure 2 is a vertical longitudinal sectional view of a portion of the storage battery showing the embodiment therein of our invention.

Figure 3 is an enlarged, vertical, sectional view of the control-float.

Figure 4 is a sectional detail view at line 4—4 of Figure 2.

Figure 5 is a perspective view showing a portion of the lever of the automatic switch and its connection with the stem of the control float.

Figure 6 is a diagrammatic view of the wiring including a portion of the ignition circuit, the shunt circuit, and showing also an auxiliary circuit for an audible signal.

In the diagram Figure 6, the ignition circuit includes the generator G, wire 23, ammeter A, battery B, the usual manual control switch S, coil, condenser C, and distributer D with the usual ground connections. The shunt circuit around the battery B includes the wire 24, resistor R, and the automatic circuit closer or switch indicated here as a whole by the letter R'.

The wiring diagram also indicates a signal bell 25 and an automatic circuit closer or switch S' in the signal circuit, as will hereinafter be described.

The battery, indicated as a whole by the letter B, is of the usual three cell type, having end walls 1, sides 2, and bottom 3, and the standard battery is adapted for our use by fashioning a vertical recess 4 in one end wall of the enclosure and at the inside of the enclosure. This recess is open to the interior of the battery and it is bounded by a pair of opposed inwardly extending flanges 5, 5, which are employed to confine the buoyant float 6 within the recess, which float stands erect in the electrolyte which fills the interior of the recess.

A stem or rod 7 is partially enclosed in an interior vertical tubular post 7', and said rod projects upwardly from the upper end of the float, and passes through a guide opening 8 provided therefor in the end wall at the upper end of the recess. To reduce the frictional contact between the exterior surfaces of the float and the inner faces of the walls of the recess, the float is grooved, as at 9, 9, and to provide for buoyancy of the float the latter is provided with sealed, interior spaces 10.

In the bottom of the float a separate chamber 11 is fashioned, for the reception, and retention of weights in the form of small balls or pellets 12 that are introduced to the chamber through a duct 13 extending upwardly from the chamber to near the top of the control-float.

An exterior casing or closure 14 is fashioned integral with one of the covers or lids 15 forming the top wall of the battery cells, and a lid 15' is sealed on the top of the casing, as are also the lids or covers 15. The electrolyte is of course supplied through an opening in a lid 15 up to the level or water line indicated at WL, and then the screw plug P is threaded into place, this level it will be observed is above the top edges of the plates or grids, one of which is indicated at E in Figure 2, and the control float 6 is submerged in the electrolyte below the liquid level and also below the top edge of the plate. In Figure 2 the float is at rest, but a space is provided in the upper part of the recess 4 to permit the float to rise if and when the density of the electrolyte reaches a specific gravity greater than that of the float.

In the closed casing 14 a horizontally disposed lever 16 is pivoted at 17 on the upper face of the lid 15, and the stem 7 of the float, which stem passes upwardly through an opening in the lid 15, is fashioned with an end fork or yoke 18 which is pivotally connected at 19 to this lever. A loose pivotal connection is provided by means of the slot 20 in the lever in order that the pivot pin 19 of the stem 7 may travel in a perpendicular plane while rocking the lever on pivot 17.

This lever forms part of the circuit maker indicated as a whole by the letter R' in Figure 6 and the movable contact member 21 of the switch or circuit member is mounted on the lever in position to contact with the stationary contact member 22 mounted on the lid 15 within the casing 14. Thus it will be apparent that when the control-float rises in Figure 2 the control switch R' will automatically be closed, and when the float falls from upraised position the switch will be open.

While the specific gravity of the control float is greater than that of the electrolyte the switch R' is open and the current of the ignition circuit 23 is passing through the battery B.

When, through excessive charging of the battery, the specific gravity of the electrolyte exceeds that of the control-float, the latter becomes buoyant in the electrolyte and rises to the upper portion of its confining recess to close the shunt circuit and thereby cause a cessation in the charging of the battery.

The difference between the normal specific gravity of the electrolyte and the weight of the control-float is determined by the use of the pellets or weights 12, which are added to the control-float in sufficient numbers to impart a weight to the float that is greater than the normal specific gravity of the electrolyte, and this difference is comparatively slight in order that the control-float may become buoyant, and rise immediately at the first or initial overcharge of the battery.

As an auxiliary device to give a warning signal should the water line or WL of the electrolyte fall below a predetermined level, a bell may be energized or a lamp illuminated, and such a signal is indicated at 25 in Figure 6. A signal switch or circuit maker S' is mounted within the casing 14, and this switch is closed by action of the float 26 maintained at the level of the electrolyte. The stem 27 of the float passes upwardly through an opening in the blade 28 of the switch S' and also through an opening in the lid 15, and it will be apparent that as the liquid level falls, the float 26 will fall with the liquid level until a head on the stem encounters the blade, and thereafter continued falling of the float causes the blade to close the circuit maker S' for energizing the signal.

Having thus fully described our invention, what we claim as new and desire to secure by Letters Patent is—

The combination with a storage battery having spaced opposed interior flanges forming an open recess in one of its walls, of a hy. ometer float comprising a hollow body having a central interior tubular post terminating at its lower end in a transverse partition, an upwardly projecting stem fixed in the post and extending through a wall-opening above the recess, said body having a weight-chamber at its lower end and a duct in one of its side walls terminating in a lateral-opening at the open-side of the recess for the introduction of weight-pellets to said chamber.

ELLVIN T. HANSON.
JOHN C. AMELL.